May 6, 1952     J. JABOUR     2,595,460
METHOD AND APPARATUS FOR GENERATING HELICAL GROOVES
Filed March 24, 1948     3 Sheets-Sheet 2
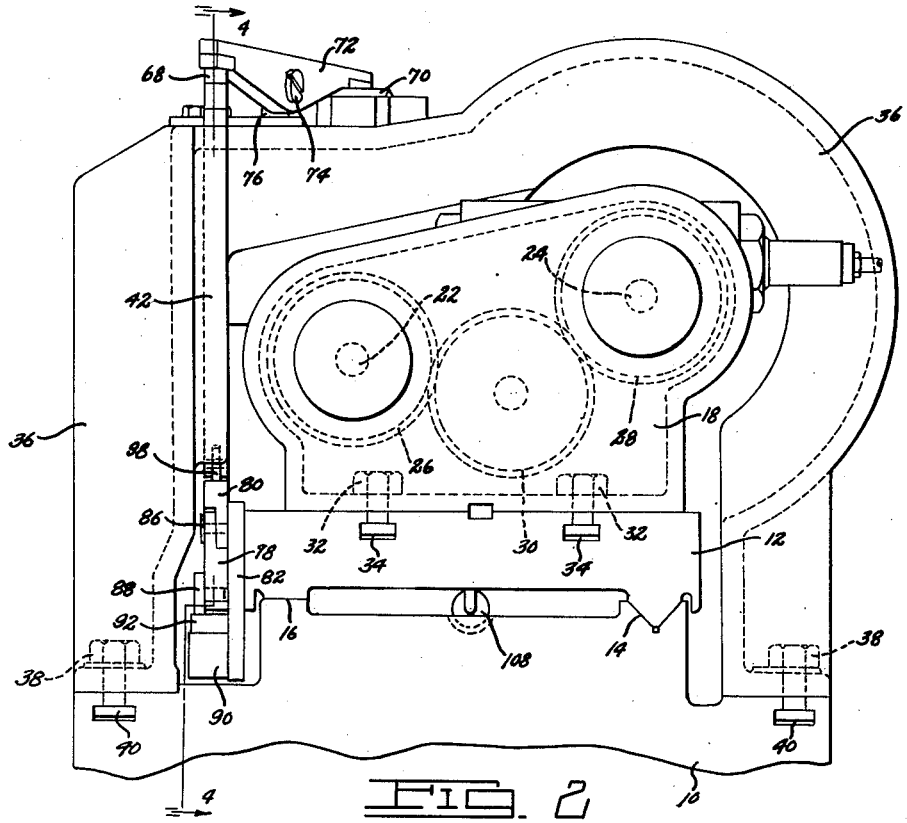
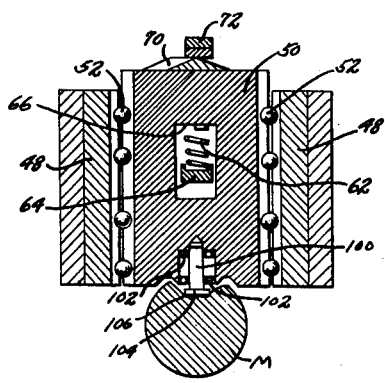
INVENTOR.
JOSEPH JABOUR
BY
ATTORNEY May 6, 1952          J. JABOUR          2,595,460
METHOD AND APPARATUS FOR GENERATING HELICAL GROOVES
Filed March 24, 1948          3 Sheets-Sheet 3
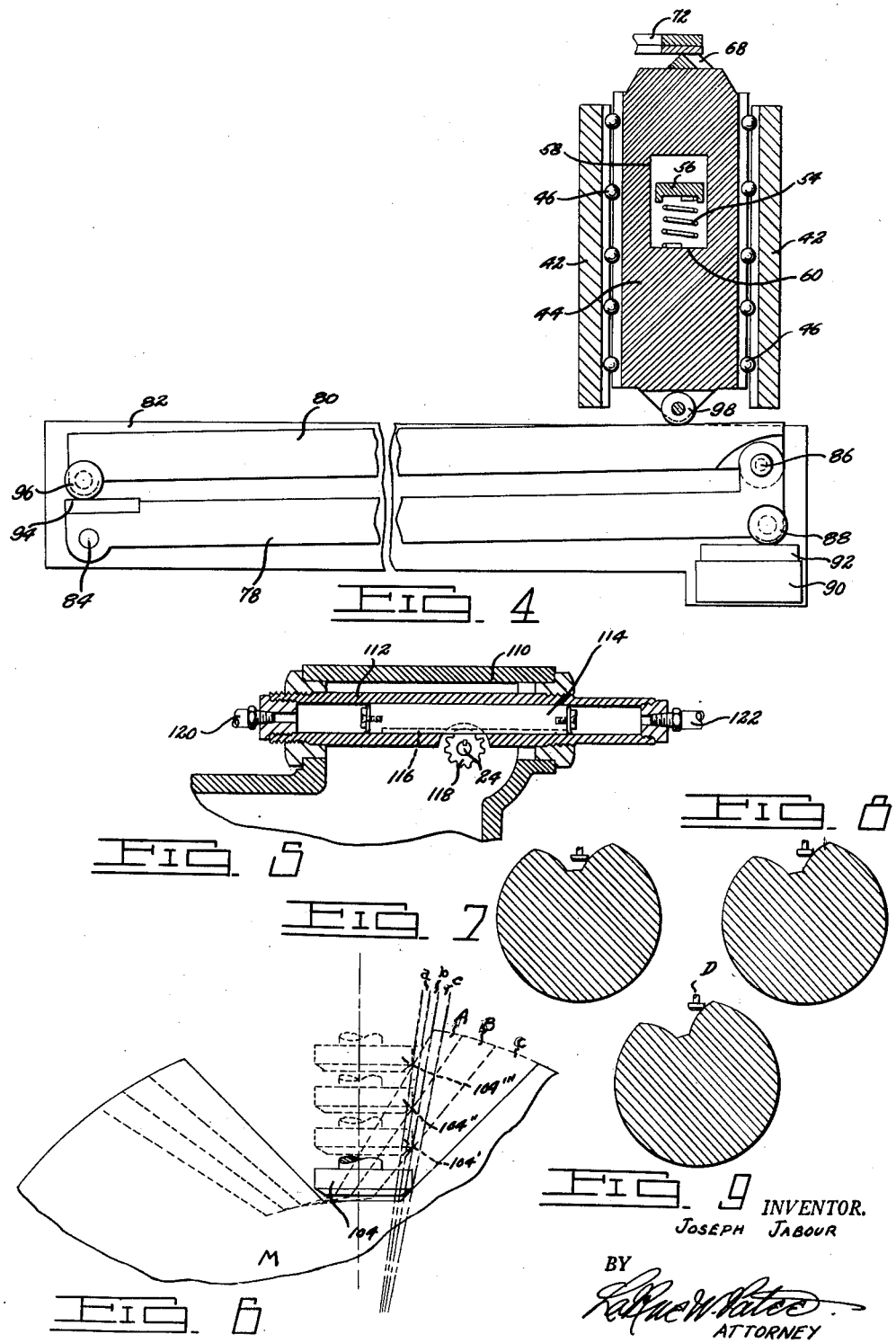
INVENTOR.
JOSEPH JABOUR
BY
ATTORNEY Patented May 6, 1952

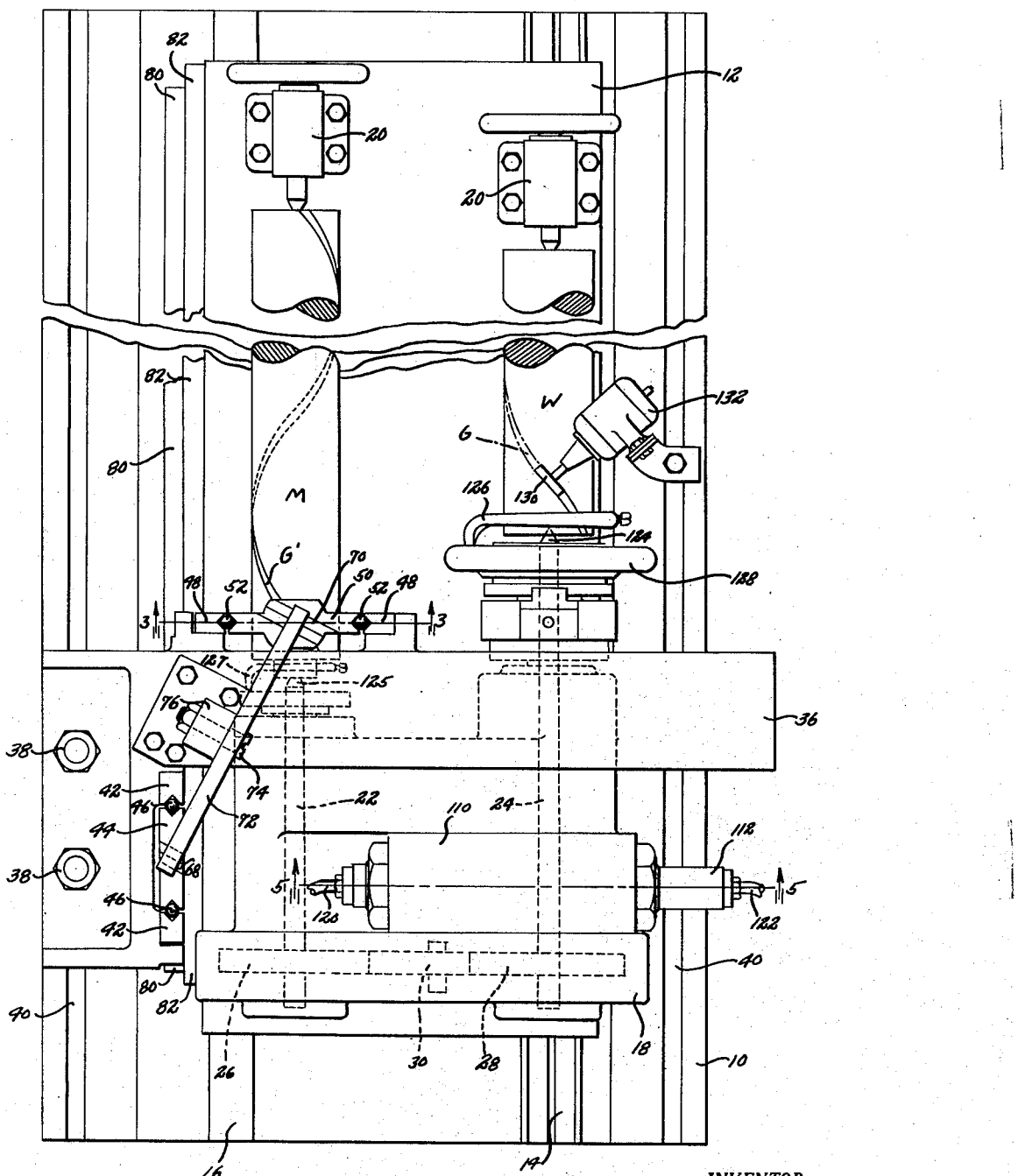

2,595,460

UNITED STATES PATENT OFFICE 2,595,460

METHOD AND APPARATUS FOR GENERATING HELICAL GROOVES

Joseph Jabour, Detroit, Mich.

Application March 24, 1948, Serial No. 16,657

8 Claims. (Cl. 51—95)

This invention relates to a method of, and apparatus for, checking, finishing or generating splines, gear teeth and the like, and more particularly to helical surfaces such as found in helical splines, broaches or gears.

In the forming or checking of helical surfaces, one of the methods commonly used, heretofore, was use of an accurately formed master corresponding to the desired finished workpiece and to provide a follower in the formed master which controls the forming or checking operation. This necessitates the use of a master for each different lead.

It is an object of the present invention to provide a single master which may be used for forming or checking a number of workpieces with different leads.

Another object of the invention is to provide a master having a groove with side-wall surfaces which in cross section are substantially at an angle to each other and at an angle to a radial line through the axis of the master and providing a follower which is radially movable in the groove for directing the movement of the workpiece during the forming or checking operation.

Another object of the invention is to provide a workpiece and a master which are longitudinally movable relative to a follower and a forming tool or gauge, and means for producing relative radial movement between the master and the follower to thereby cause relative angular rotation between the follower and the master.

A further object of the invention is to provide a driving connection between the master and the workpiece and means for urging the members in a predetermined angular direction for contacting either side face of the master groove with the follower and the corresponding side face of the formed groove with the tool during operation.

A still further object of the invention is to provide a guide for the follower which varies the radial position thereof relative to the groove in the master during longitudinal movement of the master and the workpiece relative to the follower.

Another object of the invention is to arrange the axis of the master follower and the workpiece in side by side parallel relation.

Other objects and advantages of the invention will more fully appear from the following description taken in connection with the accompanying drawings in which:

Fig. 1 is a top plan view of a machine illustrating an embodiment of the invention;

Fig. 2 is an end view of the machine shown in Fig. 1;

Fig. 3 is a fragmentary sectional view taken on line 3—3 of Fig. 1;

Fig. 4 is a fragmentary sectional view taken on line 4—4 of Fig. 2;

Fig. 5 is a fragmentary sectional view taken on line 5—5 of Fig. 1;

Fig. 6 is a diagrammatic view illustrating several positions of the follower in the groove of the master; and Figs. 7, 8, and 9 are views showing the correction in the side-wall of the groove for maintaining uniform angular movement of the follower through equal advances of the follower in the groove.

Referring to the illustrated embodiment of the invention, a machine having a base 10, is provided with a slide table 12. The table 12 is longitudinally movable in guideway 14 and supporting surface 16. Mounted on the table 12 is a housing 18 which is the head stock support for a workpiece W and a master M. The tail stocks 20 are carried by the table 12 and are in axially spaced relation with the head stocks. The head stock spindles 22 and 24 are journaled in the housing 18. The spindle 22 for one end of the master M, is provided with a gear 26 and the spindle 24 for one end of the workpiece has a gear 28. An idler gear 30 is intermeshed with the gears 26 and 28 to provide rotation of the two spindles in the same direction by rotation of the spindle.

The housing 18 is secured to the table 12 by bolts 32 which are received in T-slots 34 in the base for the purpose of adjusting the head stock spindles longitudinally on the table 12.

A longitudinally adjustable yoke 36 is carried by the base 10 and extends over the table 12. The yoke 36 is secured to the base 10 by bolts 38 fitting T-slots 40 in the base 10.

At one side of the yoke 36 are the gibs 42 which receive a vertically movable block 44. Anti-friction members 46 are arranged in V-shaped grooves to permit free vertical movement of the block 44 in the gibs 42. On the front face of the yoke 36 are other gibs 48 which likewise support block 50 having anti-friction members 52. The block 44 will be hereinafter referred to as the sine bar block, shown in Fig. 4, and the block 50 will be referred to as the follower block shown in Fig. 3.

The sine bar block is urged downwardly by a compression spring 54 between lug 56 on the yoke 36, extending through the slot 58 in the block 44, and at the bottom wall 60 of the slot 58. The follower block 50 is urged upwardly by a compression spring 62, between lug 64 carried by the yoke 36, extending through a slot 66 in the block 50, and the upper wall of the slot 66. A V-shaped projection 68 on the upper edge of the block 44 and a V-shaped projection 70 on the upper edge of the block 50 form knife edge bearings for a cross bar 72 which overlaps the blocks 44 and 50. The cross bar 72 is pivoted on a screw 74 which is received in support 76 carried by yoke 36.

A sine bar comprising two bars 78 and 80 which are carried by a plate 82 mounted on one side of the table 12 below the sine bar block 44. The bar 78 is pivoted on plate 82, as at 84, at one end of the bar 80, and has one end pivoted to the opposite end of the bar 78, as at 86. The end of the bar 78, adjacent the pivot 86, is provided with a roller 88 for resting on a support 90, or as shown, on a standard thickness guage block 92. The opposite end of the bar 78, adjacent the pivot 84, has a supporting surface 94 which receives a roller 96 carried by the end of the bar 80 at the end opposite the pivot 86. It will be understood that to change the angle of the top surface of the bar 80, different size gauge blocks may be inserted between the support 90 and roller 88 or between the supporting surface 94 and the roller 96. This is a standard sine bar construction. A roller 98 carried by the lower edge of the sine bar block 44 rides on the upper surface of the bar 80 during the travel of table 12 on the base 10. When the sine bar is arranged at an angle, as shown in Fig. 4, the sine bar block 44 is moved vertically during the table travel. Such vertical movement is transferred to the cross bar 72 which in turn correspondingly moves the follower block 50 vertically.

Referring now to Fig. 3, it will be seen that the lower edge thereof is provided with a spindle 100 supported in bearing 102. The outer and lower end of the spindle is provided with an annular head 104 having a beveled edge portion 106 for engagement with a groove formed in the master M.

The table 12 may be caused to have relative movement with the base 10 by any suitable means such as hydraulic power means or may be manually moved if desired. A power means has been diagrammatically illustrated at 108.

As means for maintaining the head 104 of the follower in contact with the side-wall of the groove in the master and for maintaining the tool or gauge in engagement with the side of the groove being formed or checked in the workpiece, there is provided a housing 110 which is carried by the housing 16. A cylinder 112 is supported in the end walls of the housing 110. A reciprocating piston 114 is mounted in the cylinder 112 and has a portion intermediate its opposite ends provided with rack teeth 116 which are in meshed engagement with a gear 118 secured by the spindle 24. Fluid pressure lines 120 and 122 are connected respectively to the opposite ends of the cylinder 112. By applying a fluid pressure through the line 120 the piston 114 will be moved to the right urging the spindle in a clockwise direction and through the gears 26, 28, and 30, the spindle 22 is urged in a clockwise direction. By applying a fluid pressure through line 122 to the opposite end of the piston 114, the spindles 22 and 24 are urged in an opposite direction.

The work and master holding end of the spindles 22 and 24 are provided with the usual centers 124 and 125 for holding the work W, and the master M, work holding dogs are shown in 126 and 127. Suitable indexing mechanism is indicated at 128 for angularly positioning the work with respect to the spindle 24 and the gearing to the master spindle 22.

To produce or check a groove G of a certain lead in a workpiece W, a master M, having a predetermined groove G', and a tool or gauge 130, shown as a grinding wheel and driven by a motor 132, are arranged to process the workpiece W, by either cutting the groove, finish grinding, polishing, or checking a preformed groove.

Since the lead of the helix is variable in determining the finished product, and since the master controls processing of the finished groove, it has heretofore been necessary to provide a master which corresponds with the lead of the finished product. This has required the forming of a master for each different workpiece having a different lead.

The present invention is directed to a method and apparatus for accomplishing the above by use of a single master for a group of different workpieces within a given range of leads. In the illustrated embodiment, a cylindrical master has been provided with a lead groove in its peripheral surface having outwardly diverging side-walls with the base of the groove having a shorter transverse dimension at the outer peripheral surface of the cylinder. A follower has a rolling contact with the side surface of the groove and is movable radially in the groove.

Referring to Figs. 6, 7, 8, and 9, wherein diagrammatic views illustrate a groove in the master with the follower in different radial positions relative to the axis of the master, it will be noted that in Fig. 6 the follower 104 is shown adjacent the base of the groove. If the master is moved longitudinally relative to the follower, and the follower is held in its radial position as shown, the master M and the workpiece W will angularly be moved by the helical side-wall of the groove in the master, and the surface of the workpiece W will be generated or checked identical to the lead of the helix taken along the path of the follower in the groove at that radial point, indicated, by the full line position of the follower 104, in Fig. 6. If however, the follower 104 is caused to be moved radially, by an inclination of the sine bar 80, to a position indicated at D in Fig. 9, and during the longitudinal movement of the master M, the helix lead will have been changed by an amount equal to the angular retard of the master and the workpiece of the left hand spiral shown.

Thus, the angular movement of the workpiece has been retarded at a uniform rate throughout its longitudinal travel. The amount of retard was determined by the inclination of the side-wall of the master groove and also by the amount of inclination given to the sine bar.

The inclination of the side-wall in the master is predetermined to cover a given range of leads. As an illustration of one form of master design, the side wall angle may be selected at 45° to a radial line, as illustrated in Fig. 6. The follower is shown at 104 adjacent the base of the groove.

If the follower 104 is moved radially outwardly to a position shown at 104' the side-wall of the groove moves angularly an amount indicated by the angle C and if the follower is moved radially and outwardly a distance equal to the first named distance of travel, to a position shown at 104", the side-wall moves angularly an amount indicated by the angle B, which is less than angle C. The angle A indicates the angular movement of the side-wall when the follower 104 has moved to another radial point indicated at 104'''. The angle A is less than the angle B and the angle B is less than the angle C. Thus if the side-wall of the groove were straight the angular movement of the master would be less for each equal outward radial movement of the follower due to the variations in angles A, B, and C, formed by a line drawn from the contact edge to the center of the master. This necessitates a correction to be made in the side-wall of the master groove in order to have the angular movements of the master move in equally uniform amounts to the radial movement of the follower. This is accomplished by the plotting of the path of contact between the follower and the side-wall which results in a curve as indicated in Figs. 7, 8, and 9.

Another factor to be considered in plotting the contour of the side-wall is that of the changes in the helix angle. When the follower is in contact with the side-wall adjacent the base of the master groove, it is contacting at a helix angle less than the helix angle at the outside diameter. This requires a correction in the side-wall to compensate for the changed lead that this has effected. This has been compensated for in plotting the curve of the side-wall of the master groove.

It is to be understood that by plotting the curve of the side-wall of the master groove the follower will permit the master and workpiece to move angularly in accordance with the raising or lowering of the follower along the side-wall of the master groove during the processing operation. By varying the inclination of the sine bar the follower is caused to be moved radially a uniformly greater or less distance over a given length of londitudinal travel, thus varying the angular movement of the workpiece during that travel at a uniform rate.

Throughout the specification and claims the term "forming" has been used to designate the operation performed upon the workpiece whether it be cutting, grinding, polishing or checking and is not to be considered a limitation on the work performed upon the workpiece.

While I have described and illustrated a preferred embodiment of the invention, it is to be understood that various changes including the size, shape and arrangement of parts may be made without departing from the spirit of my invention, that the device may be used for finish grinding, or checking a workpiece as well as forming a predetermined helix on a workpiece and it is not my intention to limit its scope other than by the terms of the appended claims.

I claim:

1. A machine for forming a helical surface on a workpiece wherein a tool is in contact with the workpiece including in combination, means for advancing a workpiece and a master axially relative to the tool, a connection between the master and workpiece whereby rotation of one causes rotation of the other said master having a helical groove in its outer periphery which is substantially V-shaped in cross section, a follower in contact with a side wall of the helix in the master for producing rotation of said master and workpiece by axial movement of said master and workpiece relative to said follower, and means for moving said follower radially of the groove at a constant rate during relative longitudinal movement of said master and said workpiece.

2. A machine for forming a helical surface on a workpiece including in combination, a support for a workpiece, a forming tool adjacent said workpiece, a master carried by a support, a driving connection between the workpiece and said master for providing simultaneous rotation thereof, said master having a helical groove in its outer periphery which is substantially V-shaped in cross-section, a follower in the groove, means for urging said master angularly for contacting one side of the groove against said follower, means for providing relative axial movement between said master and said follower, and mechanism for moving said follower radially of the groove at a constant radial motion operable by relative axial movement of the master and follower.

3. A machine including in combination, a workpiece support, a master support, gearing between said supports for causing simultaneous rotation of said workpiece support by rotation of said master support, a working tool adjacent said workpiece support, a follower adjacent said master support, means for producing relative axial movement between said supports and said follower and tool, mechanism for urging said master support angularly, and means for moving said follower radially relative to said master support at a constant rate during relative axial movement of said master support and said follower caused by the axial movement of said master support relative to said follower.

4. A machine including in combination, a workpiece support, a master support, a tool in cooperative engagement with the workpiece, and a follower in cooperative engagement with the master, means for affecting relative axial movement of the master support and the workpiece support with respect to said tool and follower supports, means for angularly moving said supports in unison, and mechanism operable by relative axial movement of said master support and follower for moving said follower radially at a constant rate of motion during axial movement of said master and said workpiece.

5. The method of forming a helix in a workpiece from a preformed master which consists in angularly moving the master and workpiece uniformly, moving the master and the workpiece longitudinally relative to a follower for the master and the tool for the workpiece, and angularly advancing or retarding the relative angular movement of the workpiece and its cooperating tool by varying the radial position of the follower in the master.

6. A machine including in combination, a base, a table carried by said base and movable longitudinally thereon, a work support carried by said table, a master support carried by said table, a driving connection between said supports for simultaneous rotation of the master and work by rotation of either support, a tool in operative engagement with the work, said master having a helical groove in its outer periphery substantially V-shaped in cross section with the side walls thereof being curved outwardly, a follower cooperating with a side wall of the groove for causing angular movement of said master support and work support during longitudinal movement of said table on said base, and means for radially moving said follower along the side wall of the master groove during longitudinal movement of said table whereby the helix angle is varied and consequently the angular movement of the master and work is varied relative to their axial movement.

7. A machine including in combination, a base, a table carried by said base and movable longitudinally thereon, a work support carried by said table, a master support carried by said table, a driving connection between said supports for causing simultaneous rotation of the master and workpiece by rotation of either, an angularly adjustable guide carried by said table, a follower carried by said base in co-operative engagement with the master, a connection between said follower and said guide for imparting movement to said follower caused by variations in the relative position of said guide for varying the relative angular position of said follower to the master, and means for moving said table and guide relative to said follower and producing angular movement of said master and workpiece supports.

8. A master having a helical groove in its outer periphery, for use with a guide in engagement with a side wall of the groove, the groove being substantially V-shaped in cross section with the side walls thereof being curved outwardly for varying the angular position of the guide relative to the master by radial movement of the guide relative to the side wall of the groove.

JOSEPH JABOUR.

REFERENCES CITED

The following references are of record in the file of this patent:

UNITED STATES PATENTS

| Number | Name | Date |
| --- | --- | --- |
| 320,969 | Richards | June 30, 1885 |
| 1,473,086 | Davidson | Nov. 6, 1923 |
| 1,989,652 | Drummond | Jan. 29, 1935 |
| 2,002,967 | Spurr | May 28, 1935 |
| 2,149,909 | Christman | Mar. 7, 1939 |
| 2,232,704 | Hughes | Feb. 25, 1941 |
| 2,284,319 | Herrmann | May 26, 1942 |

FOREIGN PATENTS

| Number | Country | Date |
| --- | --- | --- |
| 560,704 | Great Britain | Apr. 17, 1944 |